United States Patent
Song et al.

(10) Patent No.: US 9,278,411 B2
(45) Date of Patent: Mar. 8, 2016

(54) MATERIAL FEEDING APPARATUS

(71) Applicants: SHENZHEN FUTAIHONG PRECISION INDUSTRY CO., LTD., Shenzhen (CN); FIH (Hong Kong) Limited, Kowloon (HK)

(72) Inventors: San-Jun Song, Shenzhen (CN); Jian-Ping Jin, Shenzhen (CN); Bing Yu, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/498,642

(22) Filed: Sep. 26, 2014

(65) Prior Publication Data
US 2015/0151920 A1    Jun. 4, 2015

(30) Foreign Application Priority Data
Nov. 29, 2013    (CN) ............... 2013 1 0617279

(51) Int. Cl.
B25B 1/20    (2006.01)
B23P 5/00    (2006.01)
B23P 19/00    (2006.01)

(52) U.S. Cl.
CPC    *B23P 5/00* (2013.01); *B23P 19/005* (2013.01)

(58) Field of Classification Search
USPC ............................ 269/37, 40, 42, 45
See application file for complete search history.

(56) References Cited

U.S. PATENT DOCUMENTS

| | | | | |
|---|---|---|---|---|
| 4,685,603 A | * | 8/1987 | Thomas | B27F 7/006 227/113 |
| 5,727,300 A | * | 3/1998 | Ekdahl et al. | B21J 15/10 29/407.04 |

* cited by examiner

*Primary Examiner* — Lee D Wilson
*Assistant Examiner* — Shantese McDonald
(74) *Attorney, Agent, or Firm* — Novak Druce Connolly Bove + Quigg LLP

(57) ABSTRACT

A material feeding includes a delivery assembly, a pushing assembly, and a positioning assembly. The delivery assembly deliveries workpieces. The pushing assembly is coupled to the delivery assembly and includes a cylinder. The positioning assembly includes a mounting piece and an engaging piece. The mounting piece is coupled to the cylinder and includes a slantwise slot. The engaging piece is adjacent to the delivery assembly and includes a shaft, the shaft inserts through the slantwise slot to couple the engaging piece to the mounting piece. The cylinder moves vertically to drive the mounting piece, the engaging piece moves horizontally related to the delivery assembly since the shaft slides along the slantwise slot, synchronously the cylinder pushes up the workpieces.

20 Claims, 6 Drawing Sheets

MATERIAL FEEDING APPARATUS

FIELD

The present disclosure relates to a material feeding apparatus, and particularly relates to a material feeding apparatus for automatically adjusting material position.

BACKGROUND

Products normally need to be taken away from an initial position after being processed. A blow apparatus is normally used to generate airflow to blow the products away from the initial position to a better position for easily being taken. However, the blow apparatus may generate overrun airflow by errors, the products may be blown mistakenly. Operators need to manually adjust the products back to a normal position. Hence, operators may spend a large amount of time adjusting the errors, resulting in lowered working efficiency.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
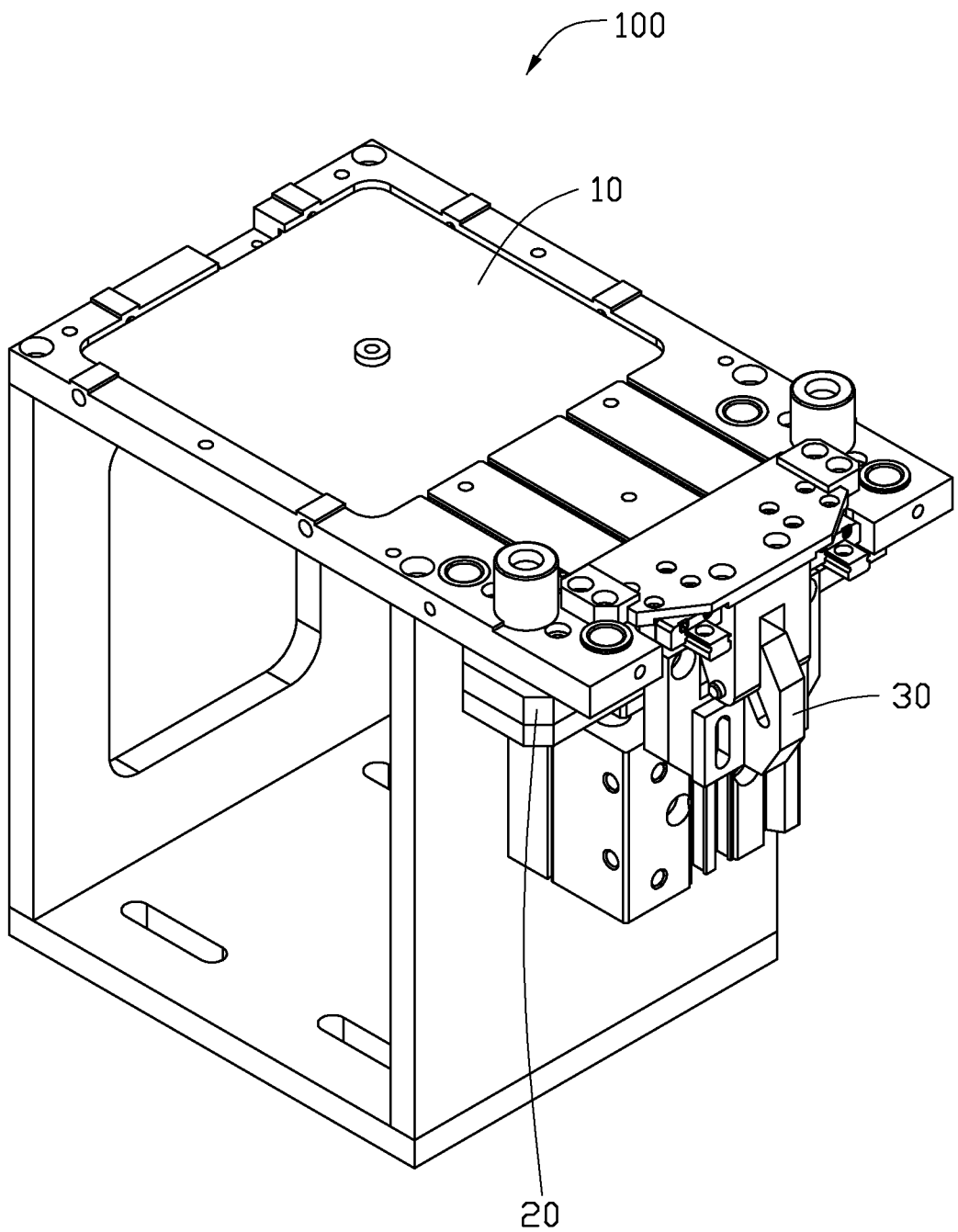
FIG. 1 is an isometric view of an exemplary embodiment of a material feeding apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates an exemplary embodiment of a material feeding apparatus 100. The material feeding apparatus 100 is used for delivering material to a predetermined position to be taken. The material feeding apparatus 100 includes a delivery assembly 10, a pushing assembly 20, and a positioning assembly 30. The positioning assembly 30 is mounted to the pushing assembly 20. The pushing assembly 20 and the positioning assembly 30 are both coupled to an end of the delivery assembly 10.

Figure 2:
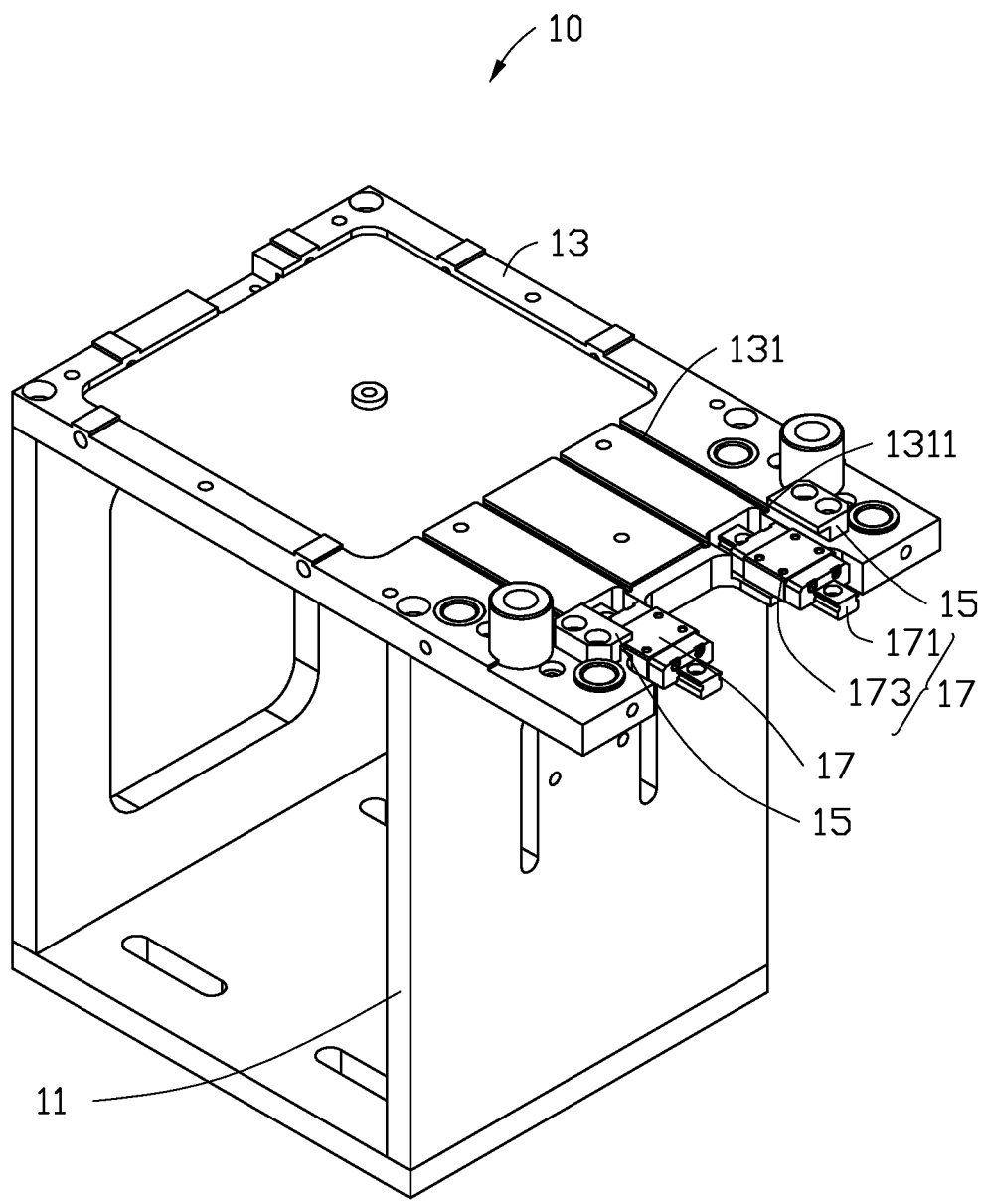
FIG. 2 is an isometric view of a delivery assembly of the material feeding apparatus of FIG. 1.

Referring to FIG. 2, the delivery assembly 10 is used for delivering material, such as screws. The delivery assembly 10 includes a base 11, a deliverer 13, two limiting pieces 15, and two sliding assemblies 17. The deliverer 13 is coupled to the base 11 and includes four delivering slots 131. Each delivering slot 131 defines a positioning hole 1311 on one end, workpieces (not shown) in the delivering slots 131 can be delivered to the corresponding positioning holes 1311, such as via airflow. The limiting pieces 15 and the sliding assemblies 17 are coupled to the deliverer 13 and are adjacent to the positioning hole 1311. The limiting pieces 15 are used to limit the positioning assembly 30 (as shown in FIG. 1). Each sliding assembly 17 is located below one limiting piece 15. Each sliding assembly 17 includes a sliding rail 171 and a sliding piece 173 slidably engaged with the sliding rail 171.

Figure 3:
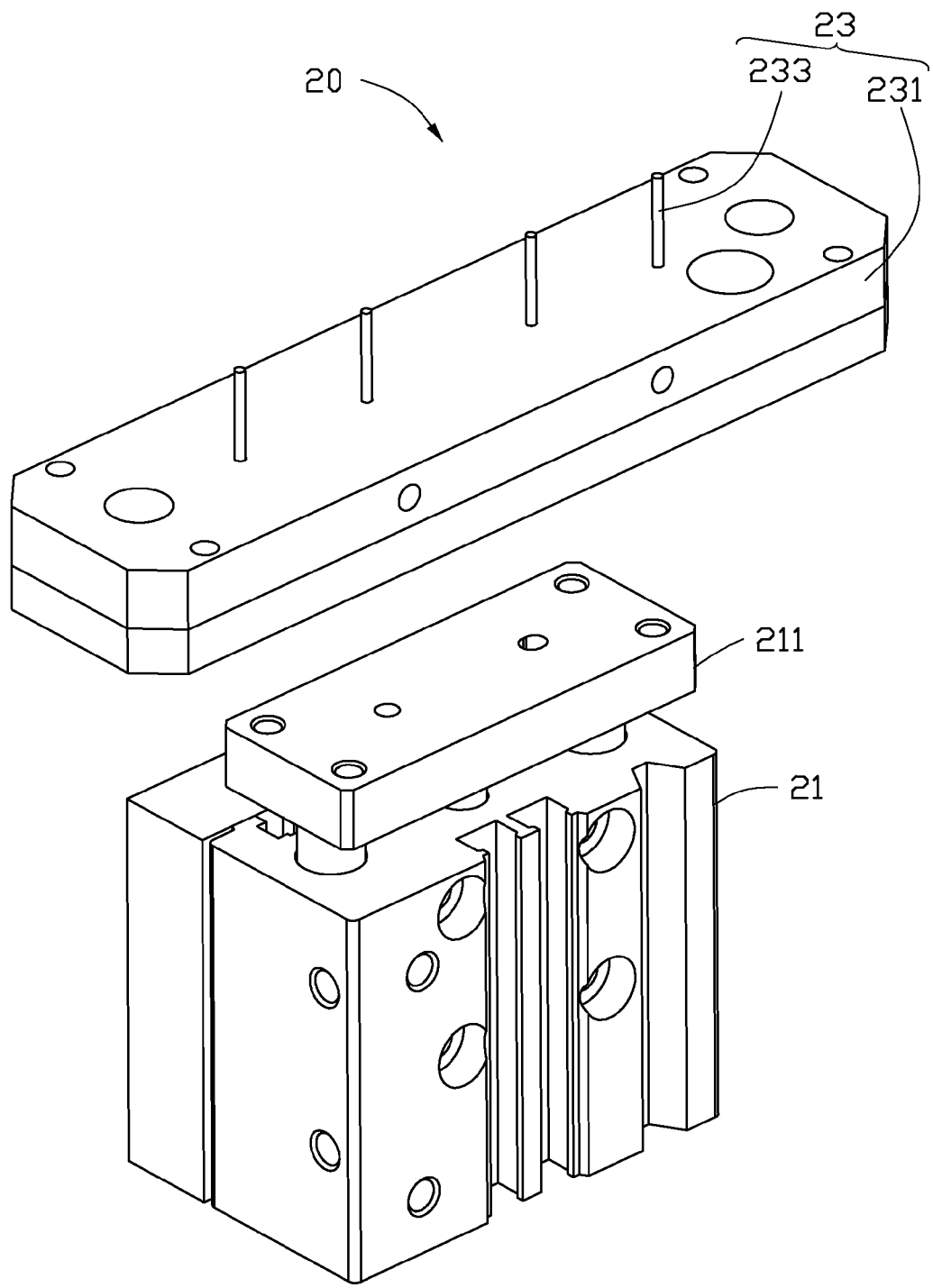
FIG. 3 is an exploded view of a pushing assembly of the material feeding apparatus of FIG. 1.

Referring to FIG. 3, the pushing assembly 20 is used to push up the workpieces delivered by the delivery assembly 10. The pushing assembly 20 includes a cylinder 21 and a connecting assembly 23. The cylinder 21 is mounted to the base 11 and located below the deliverer 13. The cylinder 21 includes a pushing board 211 on top, the pushing board 211 can move vertically when driven by the cylinder 21. The connecting assembly 23 includes a connecting board 231 and four pins 233 coupled to the connecting board 231. The connecting board 231 is coupled to and moves together with the pushing board 211. The four pins 233 are located below the four positioning holes 1311 one-to-one. The cylinder 21 drives the pushing board 211, the pushing board 211 pushes the connecting board 231 and together drive the pins 233 move vertically.

In other embodiments, the connecting assembly 23 can be ignored, the cylinder 21 can include the pins on top to pop-up workpieces.

Figure 4:
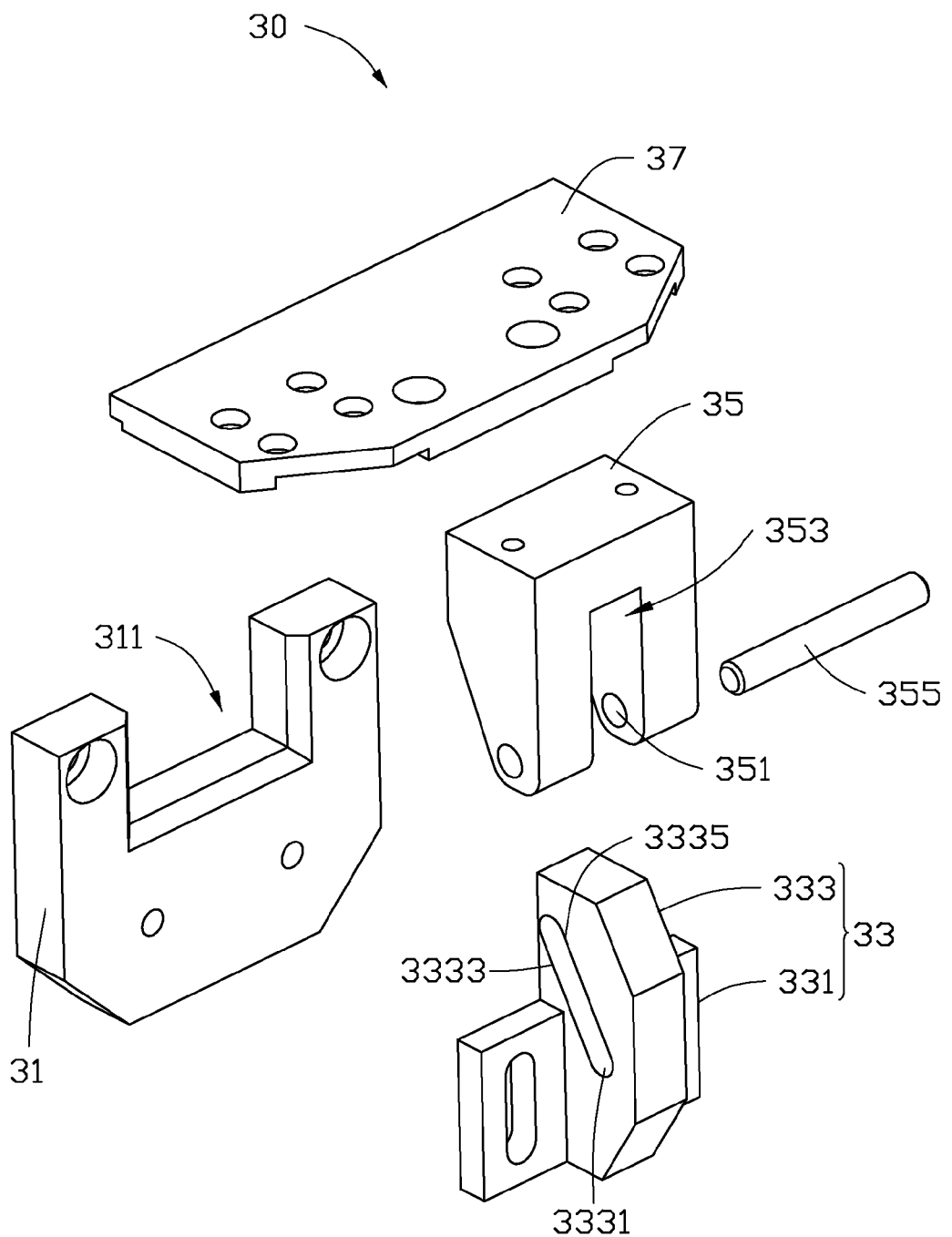
FIG. 4 is an exploded view of a positioning assembly of the material feeding apparatus of FIG. 1.
Figure 5:
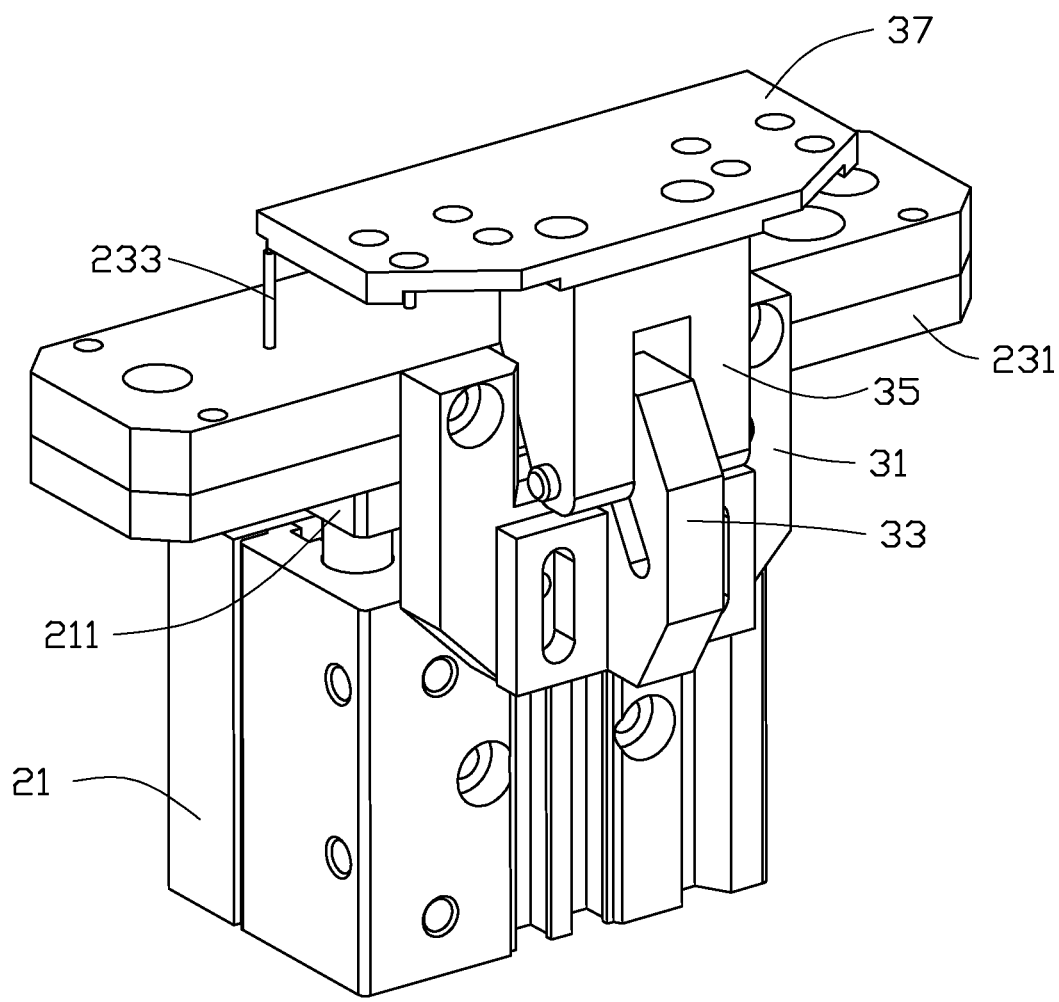
FIG. 5 is an assembled isometric view of the pushing assembly and the positioning assembly.

Referring to FIGS. 4 and 5, the positioning assembly 30 is used to position the workpiece delivered by the delivery assembly 10. The positioning assembly 30 includes a fixing board 31, a mounting piece 33, an engaging piece 35, and an upper board 37. The fixing board 31 is mounted to the connecting board 231 and is substantially U-shaped. The fixing board 31 defines an opening 311 on one end. The mounting piece 33 is mounted to the fixing board 31. The mounting piece 33 includes a resisting portion 331 and a guiding portion 333. The resisting portion 331 is mounted to the fixing board 31. The guiding portion 333 defines a slantwise slot 3331. The slantwise slot 3331 includes a first wall 3333 and a second wall 3335 opposite to the first wall 3333.

The engaging piece 35 is slidably coupled to the mounting piece 33 and partially received in the opening 311. The engaging piece 35 is substantially U-shaped and defines a receiving groove in a middle portion, and further defines an engaging hole 351 on one end. The engaging piece 35 includes a shaft 355. The mounting piece 33 is partially received in the receiving groove, the shaft 355 is inserted through the engaging hole 351 and the slantwise slot 3331, thereby the engaging piece 35 is slidably engaged with the mounting piece 33. The shaft 355 can resist the first wall 3333 or the second wall 3335 to slide along the slantwise slot 3331. The upper board 37 is mounted on the engaging piece 35 and adjacent to the positioning holes 1311 to resist the workpiece.

In other embodiments, the fixing board 31 can be ignored, the mounting piece 33 can be directly mounted to the fixing board 31. The upper board 37 can be ignored, an end of the engaging piece 35 can be designed as a plate shaped to resist the workpieces.

The material feeding apparatus 100 can be assembled as follows: the two limiting pieces 15 and the two sliding pieces 17 are mounted on the deliverer 13 and adjacent to the positioning holes 1311. The cylinder 21 is mounted to the base 11, the connecting assembly 23 is mounted on the cylinder 21 and the pins 233 are aligned with the positioning holes 1311. The fixing board 31 is mounted to the connecting assembly 23, the mounting piece 33 is mounted to the fixing board 31, the engaging piece 35 is slidably coupled to the slantwise slot 3111 via the shaft 355, the upper board 37 is mounted on the engaging piece 35 and coupled to the sliding pieces 173, and adjacent to the positioning holes 1311.

Figure 6:
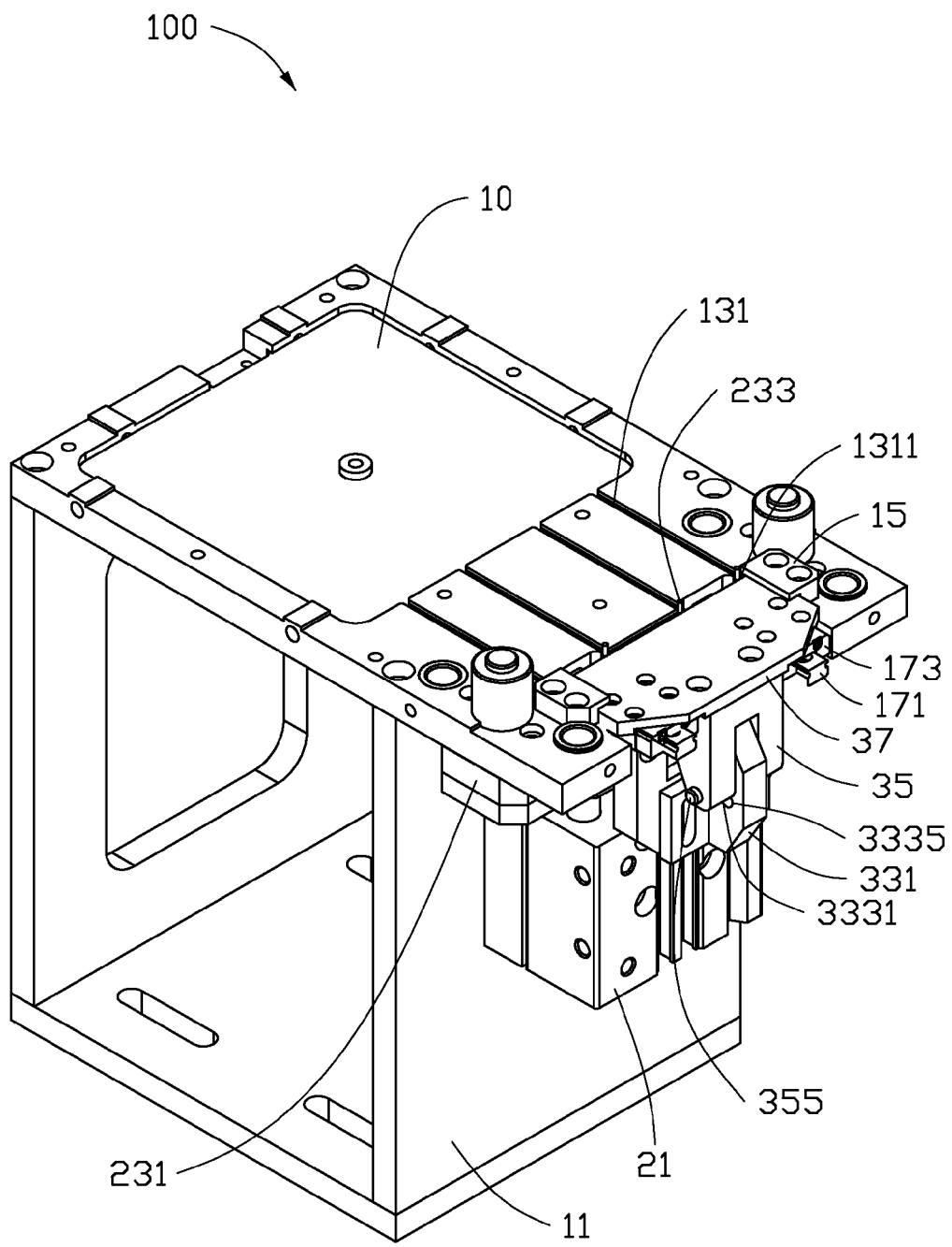
FIG. 6 is an assembled isometric view of the material feeding apparatus.

Also referring to FIG. 6, the material feeding apparatus 100 can be operated as follows: workpieces are delivered in the delivering slots 131 and to predetermined positions of the positioning holes 1311, the upper board 37 resists the workpieces to secure them in the positioning holes 1311. The cylinder 21 drives the connecting board 231 together with the four pins 233 to move upwardly, the fixing board 31 and the mounting piece 33 move upwardly together with the connecting board 231, thereby the first wall 3333 resists to the shaft 355 and drive the shaft 355 to move towards a bottom of the slantwise slot 3331. The shaft 355 drives the engaging piece 35 and further drives the upper board 37 together with the sliding piece 173 to slide away from the positioning holes 1311 along the sliding rail 171, therefore the pins 233 push up the workpieces from the positioning holes 1311 to be taken. After the workpieces are taken, the cylinder 21 drives the connecting board 231 and the pins 233 to move downwardly and away from the positioning holes 1311, the mounting piece 33 moves downwardly together with the connecting board 231, thereby the second wall 3335 resists to the shaft 355 and drive the shaft 355 to move towards a top of the slantwise slot 3331. The shaft 355 drives the engaging piece 35 and further drives the upper board 37 together with the sliding piece 173 to slide towards the positioning holes 1311 along the sliding rail 171. Then, the upper board 37 moves back adjacent to the positioning holes 1311 and the pins 233 move back to the positioning holes 1311.

The material feeding apparatus 100 includes the cylinder 21 driving the pins 233 move vertically to push up the workpieces, meanwhile driving the upper board 37 to move horizontally to position the workpieces. Therefore, the material feeding apparatus 100 is operated automatically and has a greater efficiency.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A material feeding apparatus comprising:
   a delivery assembly configured to deliver workpieces;
   a pushing assembly coupled to the delivery assembly and comprising a cylinder; and
   a positioning assembly comprising a mounting piece and an engaging piece, the mounting piece coupled to the cylinder and comprising a slantwise slot, the engaging piece adjacent to the delivery assembly and comprising a shaft, the shaft being inserted through the slantwise slot to couple the engaging piece to the mounting piece;
   wherein the cylinder moves vertically to drive the mounting piece, the engaging piece moves horizontally related to the delivery assembly since the shaft slides along the slantwise slot, synchronously the cylinder pushes up the workpieces.

2. The material feeding apparatus as claimed in claim 1, wherein the pushing assembly further comprises a connecting board and a plurality of pins coupled in the connecting board, the connecting board is mounted on the cylinder, and each pin pushes up a corresponding workpiece.

3. The material feeding apparatus as claimed in claim 2, wherein the pushing assembly further comprises a pushing board connected between the cylinder and the connecting board.

4. The material feeding apparatus as claimed in claim 2, wherein the positioning assembly further comprises a fixing board, the fixing board is sandwiched between the connecting board and the mounting piece, the fixing board is substantially U-shaped.

5. The material feeding apparatus as claimed in claim 4, wherein the mounting piece comprises a resisting portion and a guiding portion, the resisting portion is mounted to the fixing board, and the mounting piece defines the slantwise slot.

6. The material feeding apparatus as claimed in claim 5, wherein the slantwise slot is surrounded by a first wall and a second wall opposite to the first wall, the shaft resists the first wall or the second wall to drive the engaging piece.

7. The material feeding apparatus as claimed in claim 6, wherein the engaging piece is substantially U-shaped and defines a receiving groove in a middle and an engaging hole on one end, the shaft is inserted through the engaging hole, the receiving groove, and the slantwise slot, the guiding portion is partially received in the receiving groove.

8. The material feeding apparatus as claimed in claim 7, wherein the delivery assembly comprises a deliverer, the deliverer defines a plurality of delivering slots, each delivering slot defines a positioning hole on one end, the plurality of pins are aligned with the positioning holes.

9. The material feeding apparatus as claimed in claim 8, wherein the delivery assembly further comprises two limiting pieces and two sliding assemblies, the two limiting pieces are adjacent to the positioning holes, the two sliding assemblies are located below the two limiting pieces, respectively.

10. The material feeding apparatus as claimed in claim 9, wherein each sliding assembly comprises a sliding rail and a sliding piece slidably engaged with the sliding rail, the positioning assembly further comprises an upper board, the upper board is mounted on the engaging piece and coupled to the sliding piece, the upper board slides with the sliding piece related to the sliding rail.

11. The material feeding apparatus as claimed in claim 10, wherein when the cylinder moves upwardly to drive the first wall resist to the shaft, and thereby driving the engaging piece horizontally away from the positioning holes, synchronously the cylinder drives the pins pushes up the workpieces from the positioning holes.

12. The material feeding apparatus as claimed in claim 11, wherein when the cylinder moves downwardly to drive the pins back in the positioning holes, synchronously the second wall resist to the shaft, and thereby driving the engaging piece horizontally towards and then adjacent to the positioning holes.

13. A material feeding apparatus comprising:
a delivery assembly defining a plurality of positioning holes for delivering workpieces;
a pushing assembly coupled to the delivery assembly and comprising a cylinder and a plurality of pins coupled to the cylinder, each pin corresponding to one positioning hole; and
a positioning assembly comprising a mounting piece and an engaging piece, the mounting piece coupled to the cylinder and comprising a slantwise slot, the engaging piece adjacent to the positioning holes and comprising a shaft, the shaft inserting through the slantwise slot to couple the engaging piece to the mounting piece;
wherein the cylinder moves vertically to drive the mounting piece, the engaging piece moves horizontally related to the delivery assembly since the shaft slides along the slantwise slot, synchronously the cylinder drives the pins to push up the workpieces from the positioning holes.

14. The material feeding apparatus as claimed in claim 13, wherein the pushing assembly further comprises a connecting board, the pins are coupled in the connecting board, the connecting board is mounted on the cylinder, and each pin pushes up a corresponding workpiece; the pushing assembly further comprises a pushing board connected between the cylinder and the connecting board.

15. The material feeding apparatus as claimed in claim 14, wherein the positioning assembly further comprises a fixing board, the fixing board is sandwiched between the connecting board and the mounting piece, the fixing board is substantially U-shaped; the mounting piece comprises a resisting portion and a guiding portion, the resisting portion is mounted to the fixing board, and the mounting piece defines the slantwise slot.

16. The material feeding apparatus as claimed in claim 15, wherein the slantwise slot is surrounded by a first wall and a second wall opposite to the first wall, the shaft resists the first wall or the second wall to drive the engaging piece; the engaging piece is substantially U-shaped and defines a receiving groove in a middle and an engaging hole on one end, the shaft is inserted through the engaging hole, the receiving groove, and the slantwise slot, the guiding portion is partially received in the receiving groove.

17. The material feeding apparatus as claimed in claim 16, wherein the delivery assembly comprises a deliverer, the deliverer defines a plurality of delivering slots, each delivering slot defines one positioning hole on one end.

18. The material feeding apparatus as claimed in claim 17, wherein the delivery assembly further comprises two limiting pieces and two sliding assemblies, the two limiting pieces are adjacent to the positioning holes, the two sliding assemblies are located below the two limiting pieces, respectively; each sliding assembly comprises a sliding rail and a sliding piece slidably engaged with the sliding rail, the positioning assembly further comprises an upper board, the upper board is mounted on the engaging piece and coupled to the sliding piece, the upper board slides with the sliding piece related to the sliding rail.

19. The material feeding apparatus as claimed in claim 18, wherein the when the cylinder moves upwardly to drive the first wall resist to the shaft, and thereby driving the engaging piece horizontally away from the positioning holes, synchronously the cylinder drives the pins to push up the workpieces from the positioning holes.

20. The material feeding apparatus as claimed in claim 19, wherein when the cylinder moves downwardly to drive the pins back in the positioning holes, synchronously the second wall resist to the shaft, and thereby driving the engaging piece horizontally towards and then adjacent to the positioning holes.

* * * * *